(12) United States Patent
Gupta et al.

(10) Patent No.: US 11,386,607 B1
(45) Date of Patent: Jul. 12, 2022

(54) SYSTEMS AND METHODS FOR CAPTURING CONTENT

(71) Applicant: Meta Platforms, Inc., Menlo Park, CA (US)

(72) Inventors: Chetan Parag Gupta, Menlo Park, CA (US); Simon Gareth Green, Deptford (GB)

(73) Assignee: Meta Platforms, Inc., Menlo Park, CA (US)

(*) Notice: Subject to any disclaimer, the term of this patent is extended or adjusted under 35 U.S.C. 154(b) by 179 days.

(21) Appl. No.: 15/954,276

(22) Filed: Apr. 16, 2018

Related U.S. Application Data

(60) Provisional application No. 62/485,985, filed on Apr. 16, 2017.

(51) Int. Cl.
*G06T 15/20* (2011.01)
*A63F 13/525* (2014.01)
*G06T 15/04* (2011.01)

(52) U.S. Cl.
CPC ............ *G06T 15/20* (2013.01); *A63F 13/525* (2014.09); *G06T 15/04* (2013.01); *A63F 2300/8082* (2013.01)

(58) Field of Classification Search
CPC ......... G06T 15/20; G06T 15/04; A63F 13/525
USPC ........................................................ 345/633
See application file for complete search history.

(56) References Cited

U.S. PATENT DOCUMENTS

| 9,858,706 | B2 | 1/2018 | Pio | |
|---|---|---|---|---|
| 2002/0140702 | A1* | 10/2002 | Koller | G06T 5/20 345/582 |
| 2004/0222988 | A1* | 11/2004 | Donnelly | A63F 13/10 345/419 |
| 2010/0268457 | A1* | 10/2010 | Mccrae | G06T 15/30 701/408 |
| 2014/0038708 | A1* | 2/2014 | Davison | A63F 13/5252 463/31 |
| 2015/0249815 | A1* | 9/2015 | Sandrew | G06T 15/205 348/47 |
| 2017/0084073 | A1* | 3/2017 | Pio | G06T 15/20 |
| 2017/0374344 | A1* | 12/2017 | Boulton | G06T 7/70 |
| 2018/0025467 | A1* | 1/2018 | Macmillan | H04N 19/44 382/190 |
| 2018/0095648 | A1* | 4/2018 | Valdivia | G06F 3/013 |
| 2018/0108110 | A1* | 4/2018 | Cuervo | G06T 1/60 |
| 2018/0144547 | A1* | 5/2018 | Shakib | G06T 15/60 |
| 2018/0192081 | A1* | 7/2018 | Huang | G06F 3/011 |
| 2018/0199029 | A1* | 7/2018 | Van Der Auwera | H04N 13/161 |

(Continued)

OTHER PUBLICATIONS

T.El-GanainyandM. Hefeeda. Streaming virtual reality content. CoRR,abs/1612.08350,2016.*

(Continued)

*Primary Examiner* — Jin Ge

(74) *Attorney, Agent, or Firm* — Sheppard Mullin Richter & Hampton

(57) ABSTRACT

Systems, methods, and non-transitory computer-readable media can obtain information describing a set of views corresponding to a rendered environment, the views being captured based on a specified virtual camera configuration; determine at least one representation in which information describing the set of views is formatted; and output virtual reality content based at least in part on the at least one representation.

19 Claims, 9 Drawing Sheets

(56) References Cited

U.S. PATENT DOCUMENTS

| | | | | |
|---|---|---|---|---|
| 2018/0247457 A1* | 8/2018 | Nadler | ............. | G06T 3/4092 |
| 2018/0322691 A1* | 11/2018 | Mitchell | ............. | G06T 15/005 |
| 2019/0019303 A1* | 1/2019 | Siver | ............. | G06T 7/80 |
| 2019/0335203 A1* | 10/2019 | Li | ............. | H04N 19/105 |
| 2020/0036955 A1* | 1/2020 | Pesonen | ............. | H04N 13/111 |
| 2020/0045286 A1* | 2/2020 | Boyce | ............. | H04N 21/2353 |

OTHER PUBLICATIONS

Kevin Boos, David Chu, and Eduardo Cuervo. FlashBack: Immersive Virtual Reality on Mobile Devices via Rendering Memoization. In Proceedings of the 14th Annual International Conference on Mobile Systems, Applications, and Services (MobiSys '16).*

* cited by examiner

SYSTEMS AND METHODS FOR CAPTURING CONTENT

CROSS-REFERENCE TO RELATED APPLICATIONS

This application claims priority to U.S. Provisional Patent Application No. 62/485,985, filed on Apr. 16, 2017 and entitled "SYSTEMS AND METHODS FOR CAPTURING CONTENT", which is incorporated in its entirety herein by reference.

FIELD OF THE INVENTION

The present technology relates to the field of content capturing. More particularly, the present technology relates to techniques for capturing content to be presented through computing devices.

BACKGROUND

Today, people often utilize computing devices (or systems) for a wide variety of purposes. Users can operate their computing devices to, for example, interact with one another, create content, share content, and access information. Under conventional approaches, content items (e.g., images, videos, audio files, etc.) can be made available through a content sharing platform. Users can operate their computing devices to access the content items through the platform. Typically, the content items can be provided, or uploaded, by various entities including, for example, content publishers and also users of the content sharing platform.

SUMMARY

Various embodiments of the present disclosure can include systems, methods, and non-transitory computer readable media are configured to obtain information describing a set of views corresponding to a rendered environment, the views being captured based on a specified virtual camera configuration; determine at least one representation in which information describing the set of views is formatted; and output virtual reality content based at least in part on the at least one representation.

In some embodiments, the set of views are captured by a gaming engine that is configured to generate the rendered environment.

In some embodiments, the information describing the set of views corresponds to color content.

In some embodiments, the information describing the set of views corresponds to depth information.

In some embodiments, the at least one representation corresponds to a first cube map that includes information describing color content associated with the set of views.

In some embodiments, the at least one representation corresponds to a second cube map that includes information describing depth information associated with the set of views.

In some embodiments, the outputted virtual reality content is an image or a video.

In some embodiments, the outputted virtual reality content is live streamed through a social networking system.

In some embodiments, the virtual reality content corresponds to 360 degree content or 3D 360 degree content.

In some embodiments, the virtual camera configuration includes a set of virtual cameras that capture views corresponding to a cube map representation of the rendered environment.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
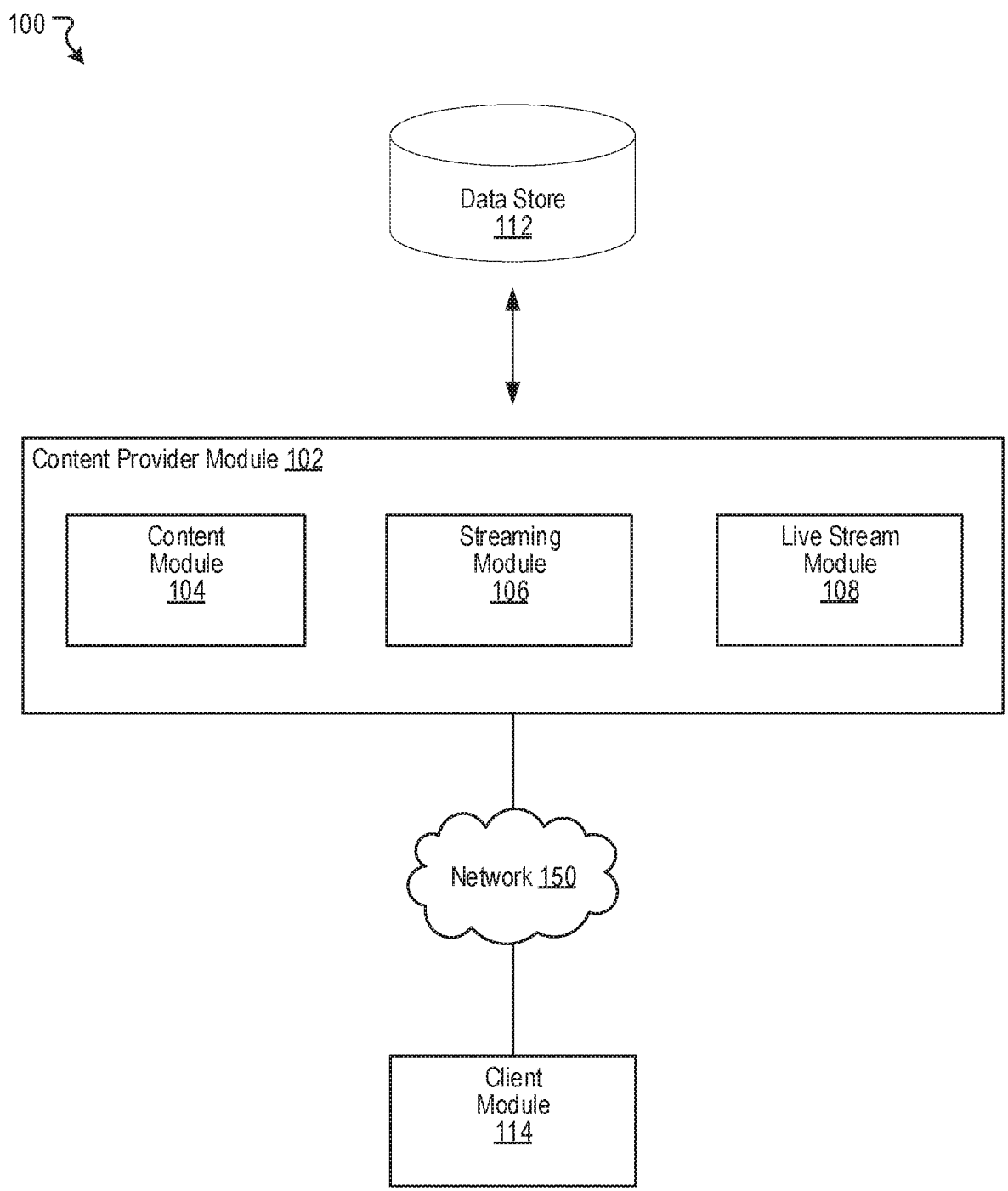
FIG. 1 illustrates an example system including an example content provider module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches for Capturing Content

People use computing devices (or systems) for a wide variety of purposes. As mentioned, under conventional approaches, a user can utilize a computing device to share content items (e.g., documents, images, videos, audio, etc.) with other users. Such content items can be made available through a content sharing platform. Users can operate their computing devices to access the content items through the platform. In some instances, users can access virtual reality content through the platform. Such virtual reality content can be presented, for example, in a viewport that is accessible through a computing device (e.g., a virtual reality device, headset, or any computing device capable of presenting virtual reality content). In general, a virtual reality content item (or immersive video) corresponds to any virtual reality media that encompasses (or surrounds) a viewer (or user). Some examples of virtual reality content items include spherical videos, half sphere videos (e.g., 180 degree videos), arbitrary partial spheres, 225 degree videos, 360 degree videos, and 3D 360 degree videos.

In some instances, a user may want to capture virtual reality content from a rendered environment. For example, the user may want to capture virtual reality content from a video game or a rendered scene. Under conventional approaches, capturing virtual reality content from a rendered environment typically involves placing virtual cameras within the rendered environment at various angles. A virtual reality content item can then be created using computer vision techniques by stitching together video streams (or feeds) that were captured by the virtual cameras. These video streams may be captured from particular locations and/or positions to capture a view of the rendered environment (e.g., 180 degree view, 225 degree view, 360 degree view, etc.). Once stitched together, the virtual reality content item can be accessed through a computing device (e.g., a virtual reality device, headset, or any computing device capable of presenting virtual reality content). Such conventional approaches for capturing virtual reality content from a rendered environment suffer from a number of limitations. For example, such conventional approaches are either computationally intensive or require convoluted workarounds that typically produce subpar virtual reality content. In another example, stitching video streams captured by virtual cameras can often introduce artifacts that lower content quality. Accordingly, such conventional approaches may not be effective in addressing these and other problems arising in computer technology.

An improved approach overcomes the foregoing and other disadvantages associated with conventional approaches. In various embodiments, virtual reality content can be captured from rendered environments without relying on conventional computer vision techniques. For example, in some embodiments, a graphics (or gaming) engine for generating a rendered environment can be instructed to position virtual cameras within the rendered environment based on a specified configuration. In some embodiments, the virtual cameras may be positioned to capture content that can be projected on the sides of a cube (i.e., cube mapped). In such embodiments, the views (or video streams) outputted directly by the graphics (or gaming) engine can be used to generate virtual reality content. In other words, rather than relying on computer vision techniques to capture and stitch together video streams of a rendered environment, the improved approaches described herein can instruct a graphics (or gaming) engine to capture a particular set of views from the rendered environment and then use these views to produce the virtual reality content. In various embodiments, the improved approaches described herein may also be used to generate corresponding depth maps for rendered environments. For example, in some embodiments, a graphics (or gaming) engine can be instructed to output depth information for captured views of a rendered environment. In various embodiments, such depth information can be used to further enhance presentation of virtual reality content. For example, in some embodiments, the depth information can be used to output 3D 360 degree content or volumetric content. Many variations are possible. The improved approaches described herein provide a number of advantages over conventional approaches. For example, the improved approaches are computationally inexpensive since the views needed to produce virtual reality content for a rendered environment are provided by a graphics (or gaming) engine that is already rendering that environment. Similarly, the graphics engine can also be instructed to output corresponding depth information (or a depth map) for those views. As a result, the improved approaches can be implemented either client-side or server-side. For example, in various embodiments, the improved approaches allow a user operating a computing device to capture and output virtual reality content corresponding to an environment being rendered by the computing device (or by a graphics engine running on the computing device). In some embodiments, some or all of the outputted virtual reality content can be saved in real-time as photos or videos. In some embodiments, the outputted virtual reality content can be live streamed in real-time. In some embodiments, the virtual reality content can be outputted at various quality levels. For example, in some embodiments, the virtual reality content can be outputted in real-time at 4K resolution. More details relating to the disclosed technology are provided below.

FIG. 1 illustrates an example system 100 including an example content provider module 102, according to an embodiment of the present disclosure. As shown in the example of FIG. 1, the content provider module 102 can include a content module 104, a streaming module 106, and a live stream module 108. In some instances, the example system 100 can include at least one data store 112. A client module 114 can interact with the content provider module 102 over one or more networks 150 (e.g., the Internet, a local area network, etc.). The client module 114 can be implemented in a software application running on a computing device (e.g., a virtual reality device, headset, or any computing device capable of presenting virtual reality content). In various embodiments, the network 150 can be any wired or wireless computer network through which devices can exchange data. For example, the network 150 can be a personal area network, a local area network, or a wide area network, to name some examples. The components (e.g., modules, elements, etc.) shown in this figure and all figures herein are exemplary only, and other implementations may include additional, fewer, integrated, or different components. Some components may not be shown so as not to obscure relevant details.

In some embodiments, the content provider module 102 can be implemented, in part or in whole, as software, hardware, or any combination thereof. In general, a module, as discussed herein, can be associated with software, hardware, or any combination thereof. In some implementations, one or more functions, tasks, and/or operations of modules can be carried out or performed by software routines, software processes, hardware, and/or any combination thereof. In some cases, the content provider module 102 can be implemented, in part or in whole, as software running on one or more computing devices or systems, such as on a user computing device or client computing system. For example, the content provider module 102, or at least a portion thereof, can be implemented as or within an application (e.g., app), a program, or an applet, etc., running on a user computing device or a client computing system, such as the user device 610 of FIG. 6. Further, the content provider module 102, or at least a portion thereof, can be implemented using one or more computing devices or systems that include one or more servers, such as network servers or cloud servers. In some instances, the content provider module 102 can, in part or in whole, be implemented within or configured to operate in conjunction with a social networking system (or service), such as the social networking system 630 of FIG. 6. The content provider module 102 can be implemented as or within a dedicated application (e.g., app), a program, or an applet running on a user computing device or client computing system. The application incorporating or implementing instructions for performing some, or all, functionality of the content provider module 102 can be created by a developer. The application can be provided to or maintained in a repository. In some cases, the application can be uploaded or otherwise transmitted over a network (e.g., Internet) to the repository. For example, a computing system (e.g., server) associated with or under control of the developer of the application can provide or transmit the application to the repository. The repository can include, for example, an "app" store in which the application can be maintained for access or download by a user. In response to a command by the user to download the application, the application can be provided or otherwise transmitted over a network from the repository to a computing device associated with the user. For example, a computing system (e.g., server) associated with or under control of an administrator of the repository can cause or permit the application to be transmitted to the computing device of the user so that the user can install and run the application. The developer of the application and the administrator of the repository can be different entities in some cases, but can be the same entity in other cases. It should be understood that many variations are possible.

In some embodiments, the content provider module 102 can be configured to communicate and/or operate with the at least one data store 112 in the example system 100. In various embodiments, the at least one data store 112 can store data relevant to the function and operation of the content provider module 102. One example of such data can be content items (e.g., virtual reality content items) that are available for access (e.g., streaming). In some implementations, the at least one data store 112 can store information associated with the social networking system (e.g., the social networking system 630 of FIG. 6). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 112 can store information associated with users, such as user identifiers, user information, profile information, user specified settings, content produced or posted by users, and various other types of user data. It should be appreciated that there can be many variations or other possibilities.

In various embodiments, the content module 104 can provide access to various types of content items (e.g., virtual reality content items) to be presented through a viewport. This viewport may be provided through a display of a computing device (e.g., a virtual reality computing device) in which the client module 114 is implemented, for example. In some instances, the computing device may be running a software application (e.g., social networking application) that is configured to present content items. Some examples of virtual reality content can include videos composed using monoscopic 360 degree views or videos composed using stereoscopic 180 degree views, to name some examples. In various embodiments, virtual reality content items can capture views (e.g., 180 degree views, 225 degree views, 360 degree views, etc.) of one or more scenes over some duration of time. For example, the computing device in which the client module 114 is implemented can request presentation of a virtual reality content item. In this example, the streaming module 106 can provide one or more streams of the virtual reality content item to be presented through the computing device.

In some embodiments, the live stream module 108 can be configured to live stream virtual reality content provided by the client module 114. When initiating a live content stream, the live stream module 108 can be utilized to communicate data (e.g., audio data, video data, etc.) corresponding to the content to be streamed live from the client module 114 and through a content provider (e.g., social networking system). The live stream module 108 can utilize any generally known techniques that allow for live streaming of content including, for example, the Real Time Messaging Protocol (RTMP). In various embodiments, the client module 114 from which the live content stream is being provided can be equipped to capture and stream virtual reality content from a rendered environment. More details regarding the client module 114 will be provided below with reference to FIG. 2.

Figure 2:
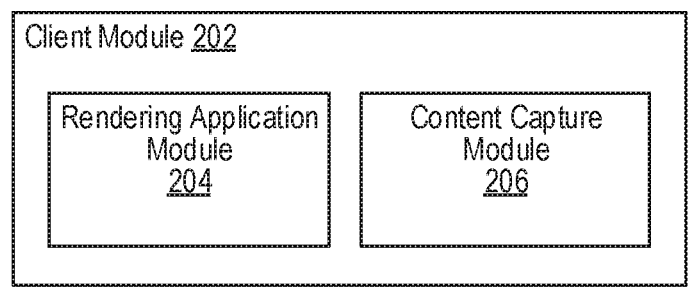
FIG. 2 illustrates an example of a client module, according to an embodiment of the present disclosure.

FIG. 2 illustrates an example of a client module 202, according to an embodiment of the present disclosure. In some embodiments, the client module 114 of FIG. 1 can be implemented with the client module 202. As shown in the example of FIG. 2, the client module 202 can include a rendering application module 204 and a content capture module 206.

The rendering application module 204 can correspond to a software application that implements a conventional graphics (or gaming) engine capable of generating rendered environments. For example, the graphics engine can be configured to generate a rendered scene in three or more dimensions. In another example, the graphics engine may be configured to generate a rendered gaming environment. In some embodiments, the graphics engine can be instructed to output views of a rendered environment using virtual cameras that are positioned within the rendered environment. Such views can be used to generate virtual reality content corresponding to the rendered environment as described below.

The content capture module 206 can be configured to capture content from rendered environments generated by the rendering application module 204. For example, in some embodiments, the content capture module 206 can capture color content (e.g., RGB content) from a rendered environment on a frame-by-frame basis based on a particular virtual camera configuration. In some embodiments, the content capture module 206 can capture depth information (or depth maps) from a rendered environment also on a frame-by-frame basis. In some embodiments, the content capture module 206 can be implemented as a software development kit (SDK) that provides tools (e.g., scripts) for integrating the rendering application module 204 and the content capture module 206 so that content can be captured from a rendered environment and then outputted as virtual reality content. More details regarding the content capture module 206 will be provided below with reference to FIG. 3.

Figure 3:
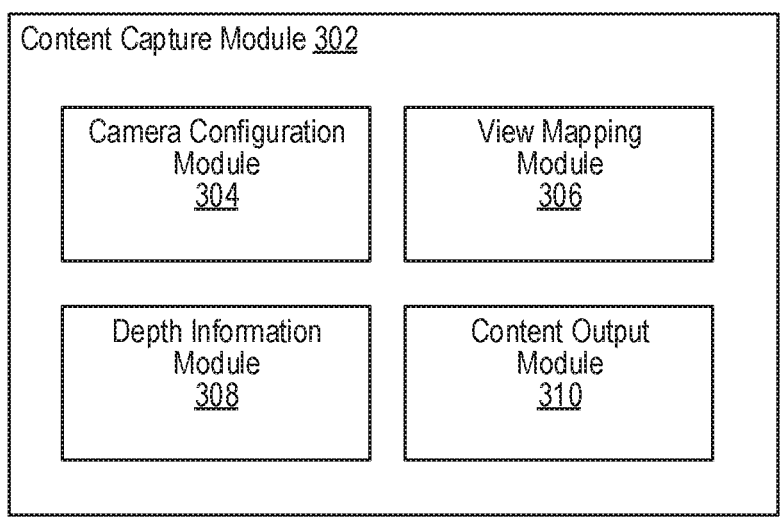
FIG. 3 illustrates an example of a content capture module, according to an embodiment of the present disclosure.

FIG. 3 illustrates an example of a content capture module 302, according to an embodiment of the present disclosure. In some embodiments, the content capture module 206 of FIG. 2 can be implemented with the content capture module 302. As shown in the example of FIG. 3, the content capture module 302 can include a camera configuration module 304, a view mapping module 306, a depth information module 308, and a content output module 310.

The camera configuration module 304 can be configured to instruct a graphics (or gaming) engine (e.g., the rendering application module 204 of FIG. 2) to capture views of a rendered environment. In some embodiments, the camera configuration module 304 can instruct the graphics engine by making one or more calls through an application programming interface (API) for interacting with the graphics engine. In some embodiments, views of a rendered environment can be captured based on a particular virtual camera configuration. For example, the camera configuration module 304 can instruct the graphics engine to place virtual cameras within the rendered environment to capture views of the rendered environment from a particular set of positions. The virtual cameras can be positioned relative to a viewpoint (e.g., object) represented in the rendered environment. Each virtual camera can then capture a view (e.g., one or more frames) of the rendered environment based on a position of the virtual camera within the rendered environment. In some embodiments, a set of virtual cameras (e.g., six virtual cameras) can be positioned to capture views of the rendered environment as a cube map. For example, the virtual cameras can capture a top view, a left view, a front view, a right view, a back view, and a bottom view from a viewpoint in the rendered environment. Many variations are possible. For example, in some embodiments, virtual cameras can be arranged to capture 3D views of a rendered environment. That is, virtual cameras can be arranged to capture a view of the rendered environment that corresponds to a left eye view and another view that corresponds to a right eye view. These views can be used to measure depth and correspondingly produce 3D virtual reality content. Again, many variations are possible.

Figure 4A:
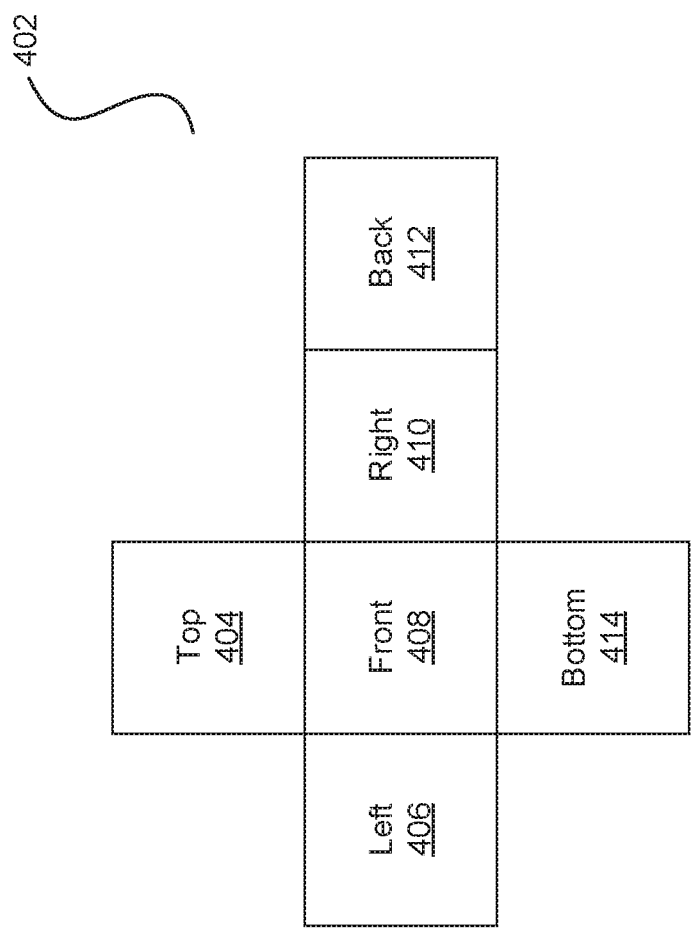
FIGS. 4A-4C illustrate examples diagrams, according to an embodiment of the present disclosure.

The view mapping module 306 can be configured to format views outputted by the graphics engine based on the virtual camera configuration. In some embodiments, the view mapping module 306 can package the views as representations (e.g., cube maps). For example, in some embodiments, color content for each frame corresponding to a captured view can be represented as a cube map, as illustrated in the example of FIG. 4A. Many variations are possible. For example, the view mapping module 306 can be configured to arrange the views based on other shape configurations. More details describing approaches for formatting views of virtual reality content are described in U.S. Pat. No. 9,858,706, filed Sep. 20, 2016, entitled "Systems and Methods for Content Streaming", which is incorporated by reference herein.

Figure 4B:
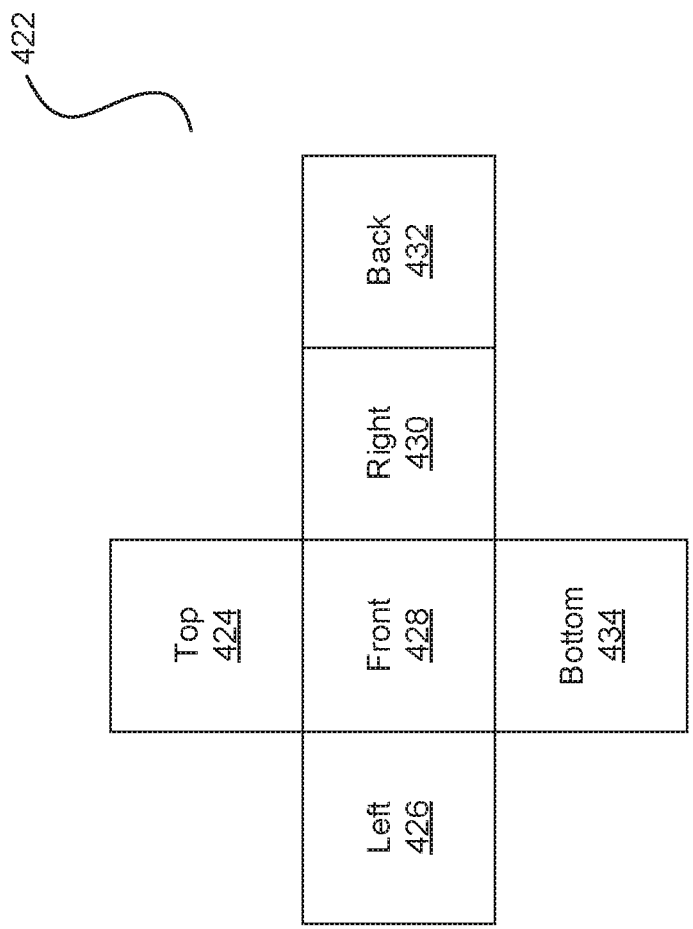

The depth information module 308 can be configured to instruct the graphics engine to provide depth information for each captured view of the rendered environment. Thus, in addition to providing color content corresponding to each captured view, the graphics engine can also provide corresponding depth information (or depth maps) corresponding to each captured view. In some embodiments, the depth information module 308 can package depth information as representations (e.g., cube maps). For example, in some embodiments, depth information for each frame corresponding to a captured view can be represented as a cube map, as illustrated in the example of FIG. 4B. In some embodiments, depth information for a frame corresponding to a captured view can provide information describing respective distances of surfaces and/or objects represented in the frame from some viewpoint (e.g., the viewpoint from which the view of the rendered environment was captured). In various embodiments, depth information corresponding to captured views of a rendered environment can be used to generate and stream 3D content (e.g., 3D 360 degree content) in real-time. In some embodiments, such depth information may be used to implement augmented reality effects, to insert or remove objects in a rendered environment, and to insert or remove a foreground (or background) in a rendered environment, to name some examples.

The content output module 310 can be configured to output content captured by the content capture module 302 in various formats. For example, in some embodiments, the content output module 310 can output portions of the captured views based on representations of the views (e.g., cube maps) as determined by the view mapping module 306. For example, the content output module 310 can output an image that corresponds to a frame in a captured view of a rendered environment from a cube map in which the frame was represented. In another example, the content output module 310 can output a video that corresponds to some portion of a captured view of a rendered environment from cube maps representing that portion of the captured view. In some embodiments, the content output module 310 can live stream content captured by the content capture module 302. For example, in some embodiments, information describing captured views can be outputted as representations (e.g., cube maps), as described above. These representations can be used to generate virtual reality content (e.g., 360 degree video content, 3D 360 degree video content) that can be live streamed through a content provider (e.g., a social networking system). In some embodiments, the content output module 310 generates the virtual reality content from the representations of the captured views. In some embodiments, the content output module 310 provides the representations of the captured views to the content provider (e.g., a social networking system) and the content provider then generates and distributes the virtual reality content. Many variations are possible.

FIG. 4A illustrates an example cube map 402 for representing color content corresponding to views captured from a rendered environment, according to an embodiment of the present disclosure. In some embodiments, the cube map 402 can be created using views outputted by a conventional graphics (or gaming) engine. For example, the cube map 402 can include six faces (or squares) that can be fused to form a three-dimensional cube object. Each face of the three-dimensional cube object can represent color (e.g., RGB) content corresponding to a captured view of a rendered environment, for example. For instance, the cube map 402 can include a top view 404 for mapping or representing color content for a top view captured from a viewpoint in a rendered environment, a left view 406 for mapping or representing color content for a left view captured from the viewpoint in the rendered environment, a front view 408 for mapping or representing color content for a front view captured from the viewpoint in the rendered environment, a right view 410 for mapping or representing color content for a right view captured from the viewpoint in the rendered environment, a back view 412 for mapping or representing color content for a back view captured from the viewpoint in the rendered environment, and a bottom view 414 for mapping or representing color content for a bottom view captured from the viewpoint in the rendered environment. Naturally, many variations are possible. For instance, in some embodiments, the cube map 402 can be repackaged (or rearranged) as a rectangle. In some embodiments, the cube map 402 can be used to generate virtual reality content (e.g., 360 degree content, 3D 360 degree content, etc.). In some embodiments, the cube map 402 can be converted to other representations from which virtual reality content can be generated. For example, in some embodiments, the cube map 402 can be converted to an equirectangular projection from which virtual reality content can be generated. Many variations are possible.

FIG. 4B illustrates an example cube map 422 for representing depth information that corresponds to views captured from a rendered environment. In some embodiments, the cube map 422 can be created using depth information corresponding to views outputted by a conventional graphics (or gaming) engine. For example, the cube map 422 can include six faces (or squares) that can be fused to form a three-dimensional cube object. Each face of the three-dimensional cube object can represent depth information (or a depth map) corresponding to a captured view of a rendered environment, for example. For instance, the cube map 422 can include a top view 424 for mapping or representing depth information for a top view captured from a viewpoint in a rendered environment, a left view 426 for mapping or representing depth information for a left view captured from the viewpoint in the rendered environment, a front view 428 for mapping or representing depth information for a front view captured from the viewpoint in the rendered environment, a right view 430 for mapping or representing depth information for a right view captured from the viewpoint in the rendered environment, a back view 432 for mapping or representing depth information for a back view captured from the viewpoint in the rendered environment, and a bottom view 434 for mapping or representing depth information for a bottom view captured from the viewpoint in the rendered environment. Naturally, many variations are possible. For instance, in some embodiments, the cube map 422 can be repackaged (or rearranged) as a rectangle. In some embodiments, the cube map 422 can be used to generate virtual reality content (e.g., 360 degree content, 3D 360 degree content, etc.). In some embodiments, the cube map 422 can be converted to other representations from which virtual reality content can be generated. For example, in some embodiments, the cube map 422 can be converted to an equirectangular projection from which 3D virtual reality content can be generated. Many variations are possible.

Figure 4C:
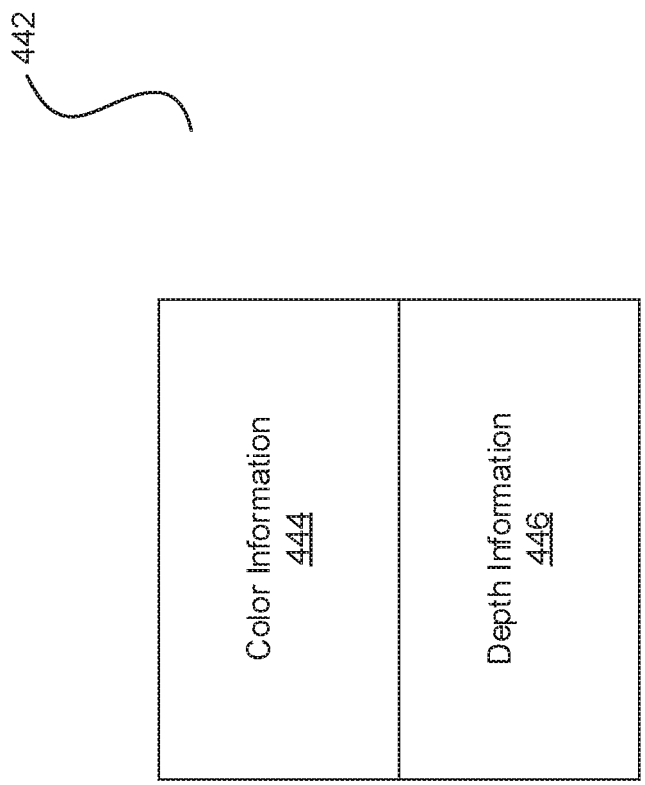

In some embodiments, color content for a set of views represented in a cube map and corresponding depth information for those views represented in another cube map can be packaged as a combined content mapping 442, as illustrated in the example of FIG. 4C. For example, in some embodiments, the combined content mapping 442 can include color (e.g., RGB) information 444 captured by the cube map 402 and depth information 446 captured by the cube map 422. In some embodiments, the cube maps 402, 422 can be repackaged in myriad ways including, for example, as rectangles shown in the example of FIG. 4C. In various embodiments, the combined content mapping 442 can be used to output virtual reality content (or portions of virtual reality content) as images, videos, or live streams.

Figure 5:
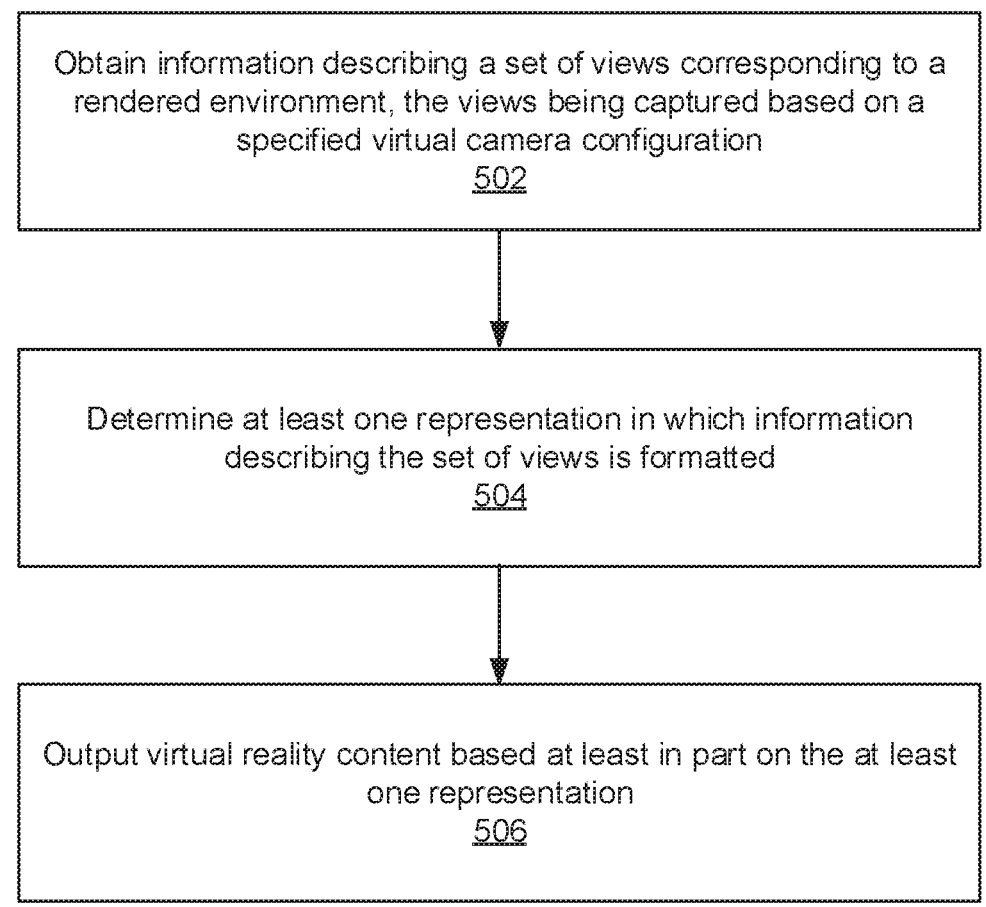
FIG. 5 illustrates an example method, according to an embodiment of the present disclosure.

FIG. 5 illustrates an example method 500, according to an embodiment of the present disclosure. It should be appreciated that there can be additional, fewer, or alternative steps performed in similar or alternative orders, or in parallel, within the scope of the various embodiments discussed herein unless otherwise stated.

At block 502, information describing a set of views corresponding to a rendered environment are obtained. The views can be captured based on a specified virtual camera configuration. At block 504, at least one representation in which information describing the set of views is formatted is determined. At block 506, virtual reality content is outputted based at least in part on the at least one representation.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 6:
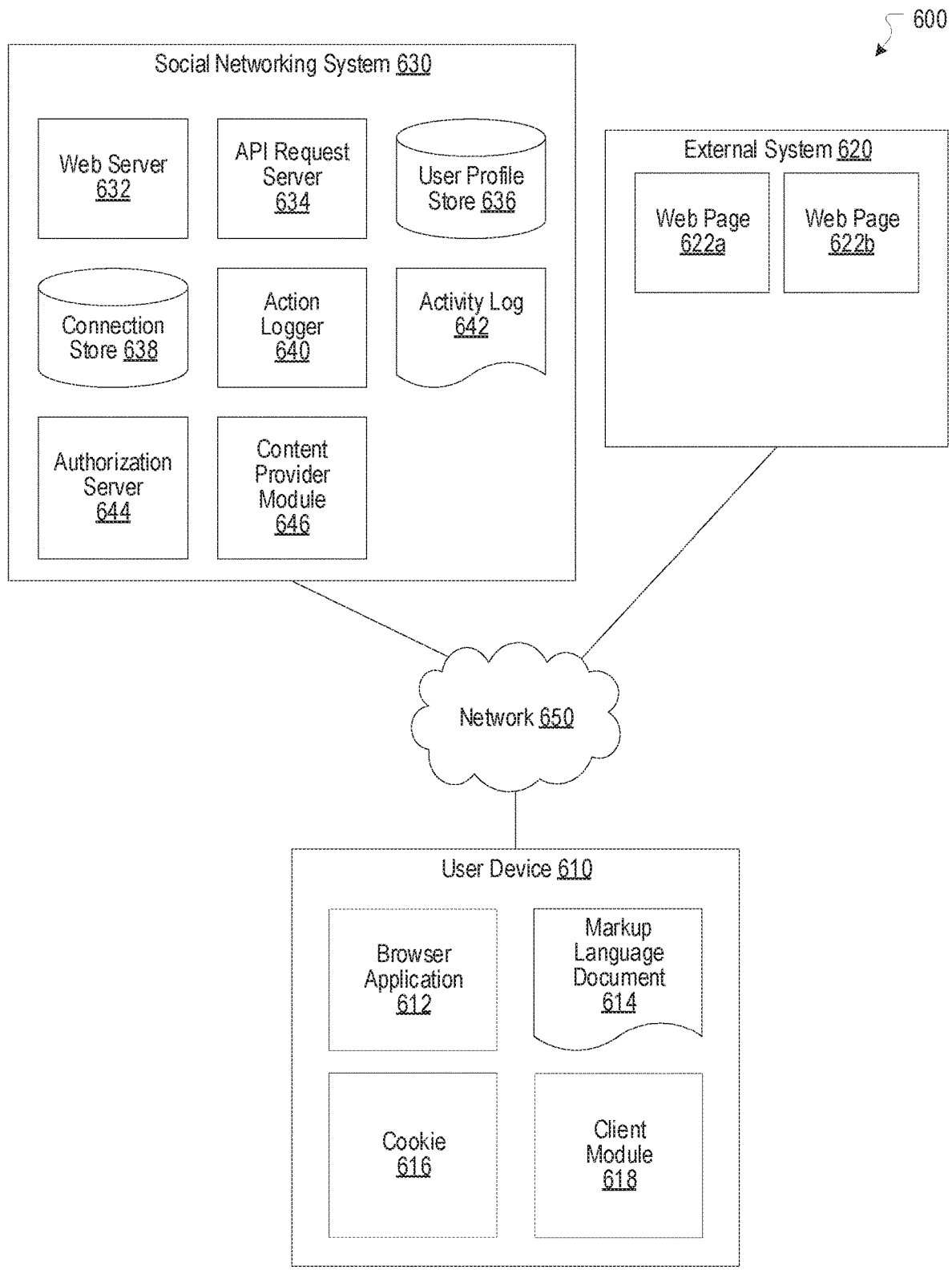
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices (or systems) that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the Silverlight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content. As discussed previously, it should be appreciated that there can be many variations or other possibilities.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a content provider module 646. The content provider module 646 can, for example, be implemented as the content provider module 102 of FIG. 1. In some embodiments, the content provider module 646, or some of its features, can be implemented in a computing device, e.g., the user device 610. In some embodiments, the user device 610 can include a client module 618. The client module 618 can, for example, be implemented as the client module 114 of FIG. 1. The network 650 can, for example, be implemented as the network 150 of FIG. 1. As discussed previously, it should be appreciated that there can be many variations or other possibilities.

Hardware Implementation

Figure 7:
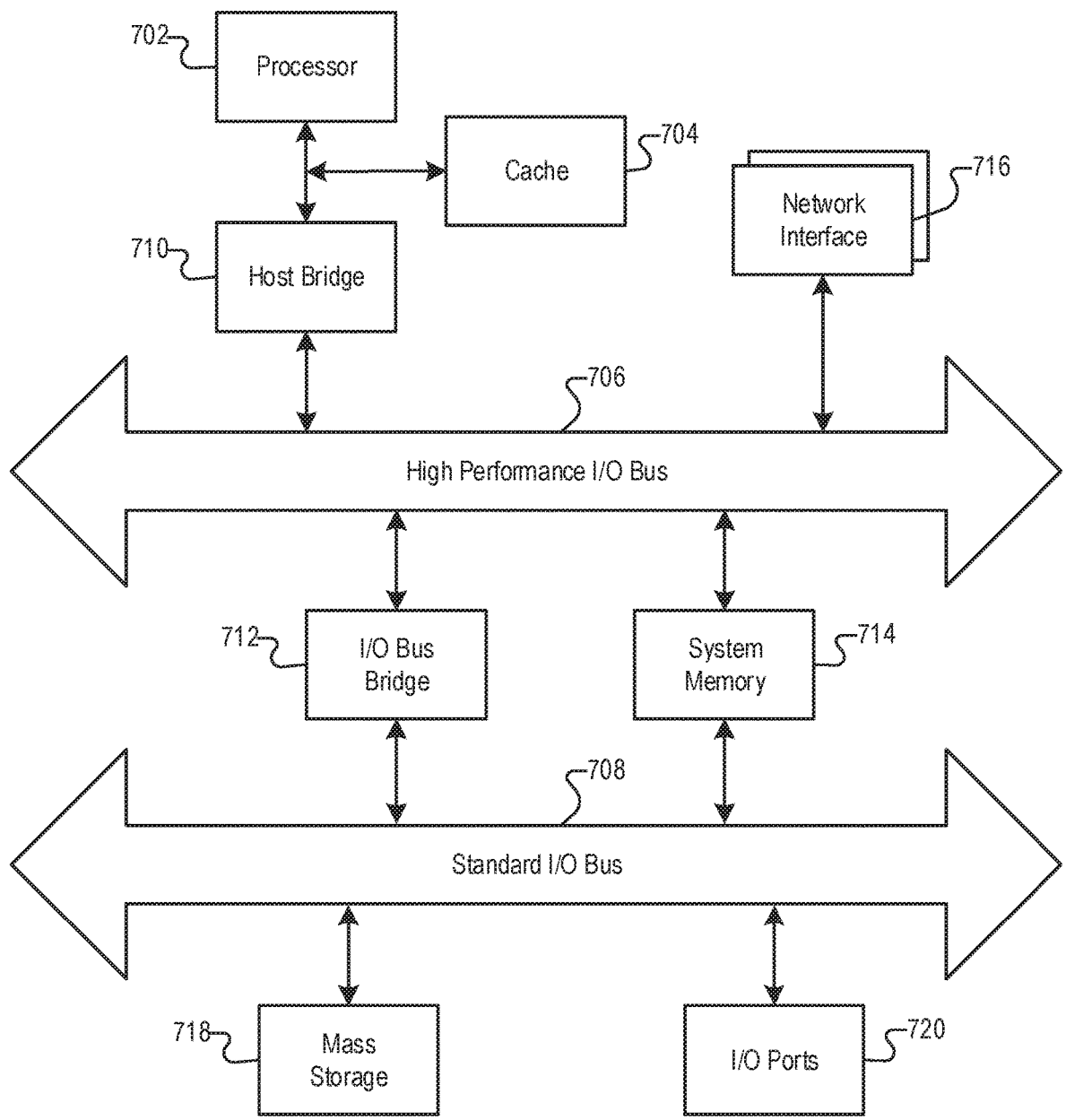
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   obtaining, by a computing system, information describing a set of views captured by a set of virtual cameras positioned within a rendered environment based on a virtual camera configuration, the obtaining further comprising:
   providing, by the computing system, instructions to a gaming engine to generate the rendered environment; and
   providing, by the computing system, the virtual camera configuration to the gaming engine, wherein the gaming engine is configured to position the set of virtual cameras within the rendered environment based on the virtual camera configuration, wherein the virtual camera configuration specifies a first virtual camera arrangement to capture a left-eye view of the rendered environment and a second virtual camera arrangement to capture a right-eye view of the rendered environment;
   determining, by the computing system, a first cube map representation of color content associated with the obtained information describing the set of views captured by the set of virtual cameras;
   determining, by the computing system, a second cube map representation of depth information associated with the obtained information describing the set of views captured by the set of virtual cameras;
   repackaging, by the computing system, at least the first cube map representation and the second cube map representation as at least one combined representation, wherein the at least one combined representation includes (i) the color content and (ii) the depth information, wherein the depth information provides respective distances of one or more objects represented in the set of views captured by the set of virtual cameras;
   generating, by the computing system, 3D virtual reality content based on the at least one combined representation determined from the set of views captured by the set of virtual cameras positioned within the rendered environment; and
   providing, by the computing system, the 3D virtual reality content to a content provider system for distribution to users of the content provider system.

2. The computer-implemented method of claim 1, wherein providing the virtual camera configuration to the gaming engine further comprises:
   providing, by the computing system, the virtual camera configuration through an application programming interface (API) for interacting with the gaming engine.

3. The computer-implemented method of claim 1, wherein the color content corresponds to at least one of a top view, bottom view, front view, back view, left view, or right view from a viewpoint in the rendered environment.

4. The computer-implemented method of claim 1, wherein the depth information corresponds to at least one of a top view, bottom view, front view, back view, left view, or right view from a viewpoint in the rendered environment.

5. The computer-implemented method of claim 1, wherein the at least one combined representation includes a first cube map associated with information describing the color content associated with the set of views.

6. The computer-implemented method of claim 1, wherein the at least one combined representation includes a second cube map associated with information describing the depth information associated with the set of views.

7. The computer-implemented method of claim 1, wherein the generated 3D virtual reality content is an image or a video.

8. The computer-implemented method of claim 1, wherein the generated 3D virtual reality content is live streamed through a social networking system.

9. The computer-implemented method of claim 1, wherein the generated 3D virtual reality content corresponds to 360 degree content or 3D 360 degree content.

10. A system comprising:
at least one processor; and
a memory storing instructions that, when executed by the at least one processor, cause the system to perform:
obtaining information describing a set of views captured by a set of virtual cameras positioned within a rendered environment based on a virtual camera configuration, the obtaining further comprising:
providing instructions to a gaming engine to generate the rendered environment; and
providing the virtual camera configuration to the gaming engine, wherein the gaming engine is configured to position the set of virtual cameras within the rendered environment based on the virtual camera configuration, wherein the virtual camera configuration specifies a first virtual camera arrangement to capture a left-eye view of the rendered environment and a second virtual camera arrangement to capture a right-eye view of the rendered environment;
determining a first cube map representation of color content associated with the obtained information describing the set of views captured by the set of virtual cameras;
determining a second cube map representation of depth information associated with the obtained information describing the set of views captured by the set of virtual cameras;
repackaging at least the first cube map representation and the second cube map representation as at least one combined representation, wherein the at least one combined representation includes (i) the color content and (ii) the depth information, wherein the depth information provides respective distances of one or more objects represented in the set of views captured by the set of virtual cameras;
generating 3D virtual reality content based on the at least one combined representation determined from the set of views captured by the set of virtual cameras positioned within the rendered environment; and
providing the 3D virtual reality content to a content provider system for distribution to users of the content provider system.

11. The system of claim 10, wherein providing the virtual camera configuration to the gaming engine further comprises:
providing the virtual camera configuration through an application programming interface (API) for interacting with the gaming engine.

12. The system of claim 10, wherein the color content corresponds to at least one of a top view, bottom view, front view, back view, left view, or right view from a viewpoint in the rendered environment.

13. The system of claim 10, wherein the depth information corresponds to at least one of a top view, bottom view, front view, back view, left view, or right view from a viewpoint in the rendered environment.

14. The system of claim 10, wherein the at least one combined representation includes a first cube map associated with information describing the color content associated with the set of views.

15. A non-transitory computer-readable storage medium including instructions that, when executed by at least one processor of a computing system, cause the computing system to perform a method comprising:
obtaining information describing a set of views captured by a set of virtual cameras positioned within a rendered environment based on a virtual camera configuration, the obtaining further comprising:
providing instructions to a gaming engine to generate the rendered environment; and
providing the virtual camera configuration to the gaming engine, wherein the gaming engine is configured to position the set of virtual cameras within the rendered environment based on the virtual camera configuration, wherein the virtual camera configuration specifies a first virtual camera arrangement to capture a left-eye view of the rendered environment and a second virtual camera arrangement to capture a right-eye view of the rendered environment;
determining a first cube map representation of color content associated with the obtained information describing the set of views captured by the set of virtual cameras;
determining a second cube map representation of depth information associated with the obtained information describing the set of views captured by the set of virtual cameras;
repackaging at least the first cube map representation and the second cube map representation as at least one combined representation, wherein the at least one combined representation includes (i) the color content and (ii) the depth information, wherein the depth information provides respective distances of one or more objects represented in the set of views captured by the set of virtual cameras;
generating 3D virtual reality content based on the at least one combined representation determined from the set of views captured by the set of virtual cameras positioned within the rendered environment; and
providing the 3D virtual reality content to a content provider system for distribution to users of the content provider system.

16. The non-transitory computer-readable storage medium of claim 15, wherein providing the virtual camera configuration to the gaming engine further comprises:
providing the virtual camera configuration through an application programming interface (API) for interacting with the gaming engine.

17. The non-transitory computer-readable storage medium of claim 15, wherein the color content corresponds to at least one of a top view, bottom view, front view, back view, left view, or right view from a viewpoint in the rendered environment.

18. The non-transitory computer-readable storage medium of claim 15, wherein the depth information corresponds to at least one of a top view, bottom view, front view, back view, left view, or right view from a viewpoint in the rendered environment.

19. The non-transitory computer-readable storage medium of claim 15, wherein the at least one combined representation includes a first cube map associated with information describing the color content associated with the set of views.

* * * * *